Sept. 20, 1960     J. H. ALCAMO     2,952,859
SURGEONS' PRE-OPERATING SCRUBBING MACHINE
Filed March 19, 1958     9 Sheets—Sheet 1

Inventor:
John H. Alcamo

Sept. 20, 1960      J. H. ALCAMO      2,952,859

SURGEONS' PRE-OPERATING SCRUBBING MACHINE

Filed March 19, 1958      9 Sheets-Sheet 2

Sept. 20, 1960 J. H. ALCAMO 2,952,859
SURGEONS' PRE-OPERATING SCRUBBING MACHINE
Filed March 19, 1958 9 Sheets-Sheet 4

Inventor:
John H. Alcamo
By Roy Griffith Jones
Attorney.

Sept. 20, 1960 J. H. ALCAMO 2,952,859
SURGEONS' PRE-OPERATING SCRUBBING MACHINE
Filed March 19, 1958 9 Sheets-Sheet 5
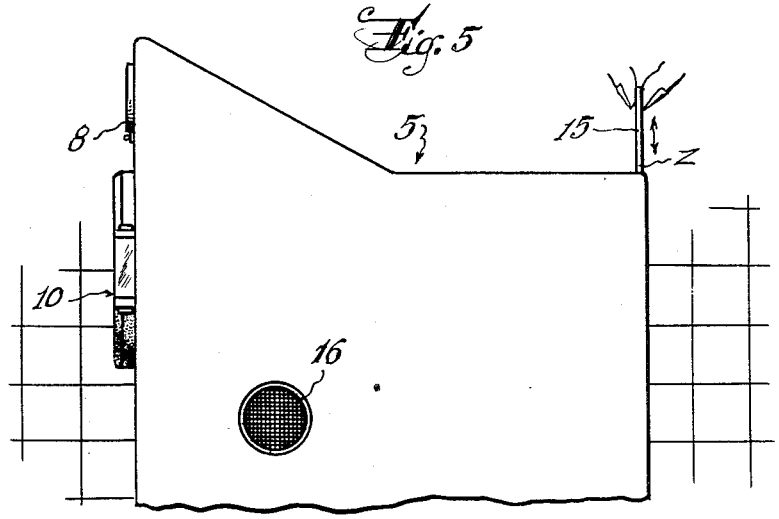
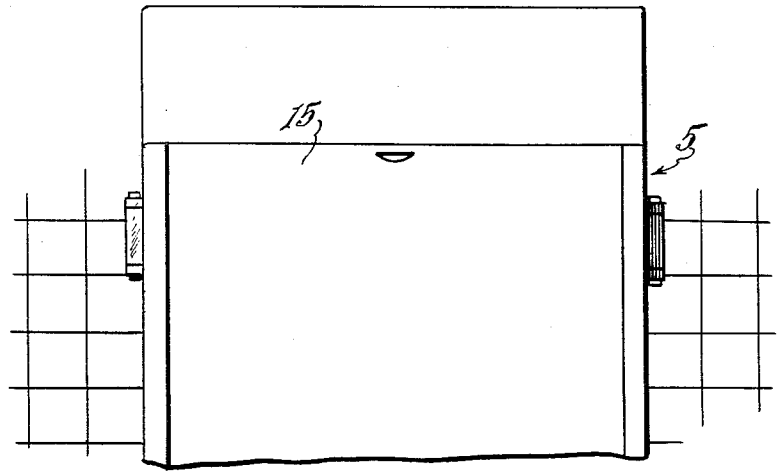

Sept. 20, 1960 J. H. ALCAMO 2,952,859
SURGEONS' PRE-OPERATING SCRUBBING MACHINE
Filed March 19, 1958 9 Sheets-Sheet 6
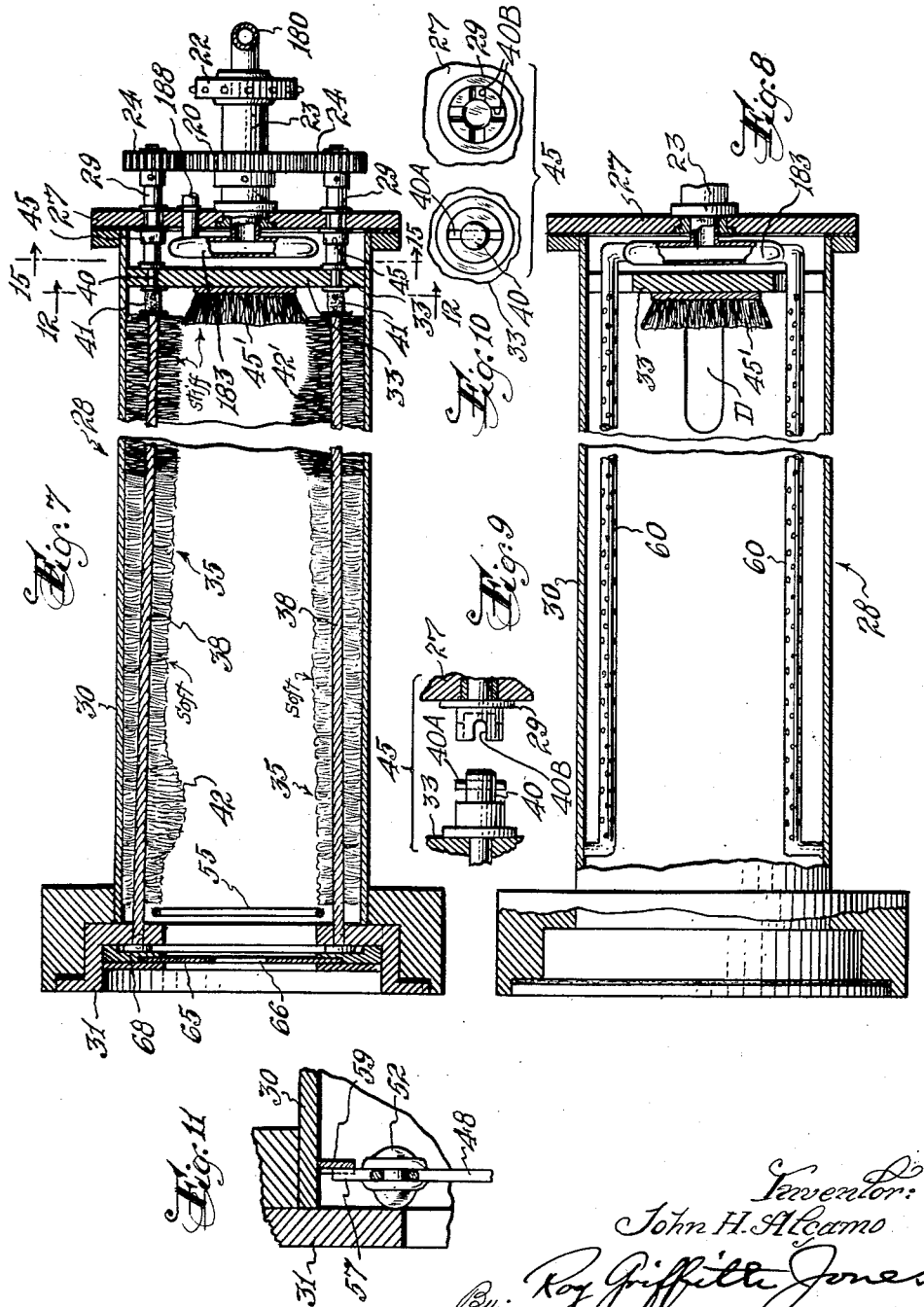
Inventor:
John H. Alcamo
By: Roy Griffith Jones
Attorney Sept. 20, 1960      J. H. ALCAMO      2,952,859
SURGEONS' PRE-OPERATING SCRUBBING MACHINE
Filed March 19, 1958      9 Sheets-Sheet 7
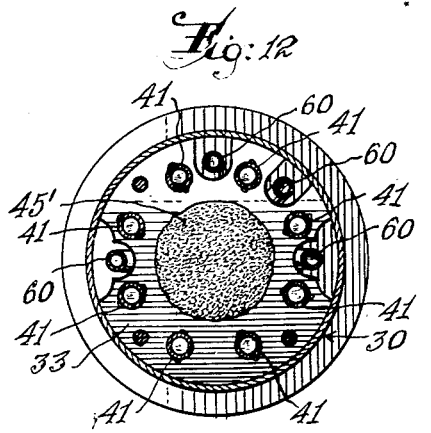
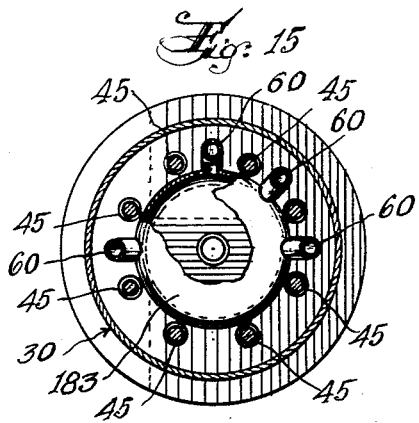
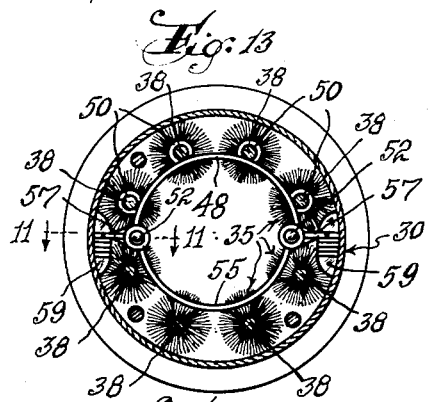
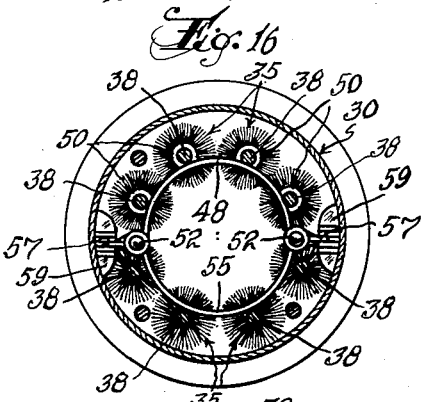
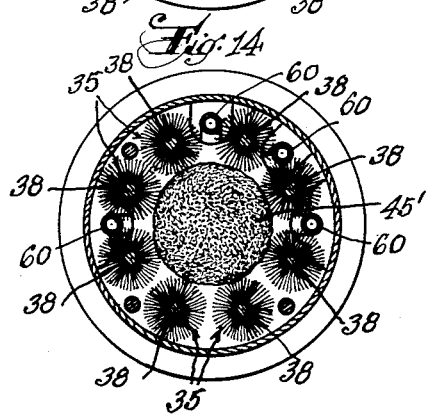
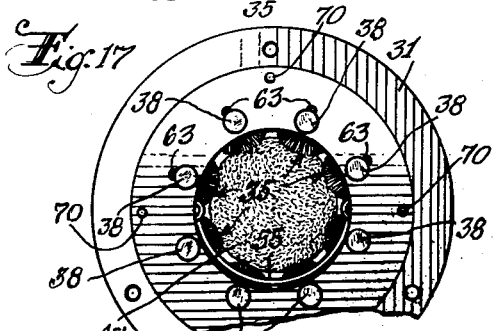
Inventor:
John H. Alcamo
By Roy Griffith Jones
Attorney

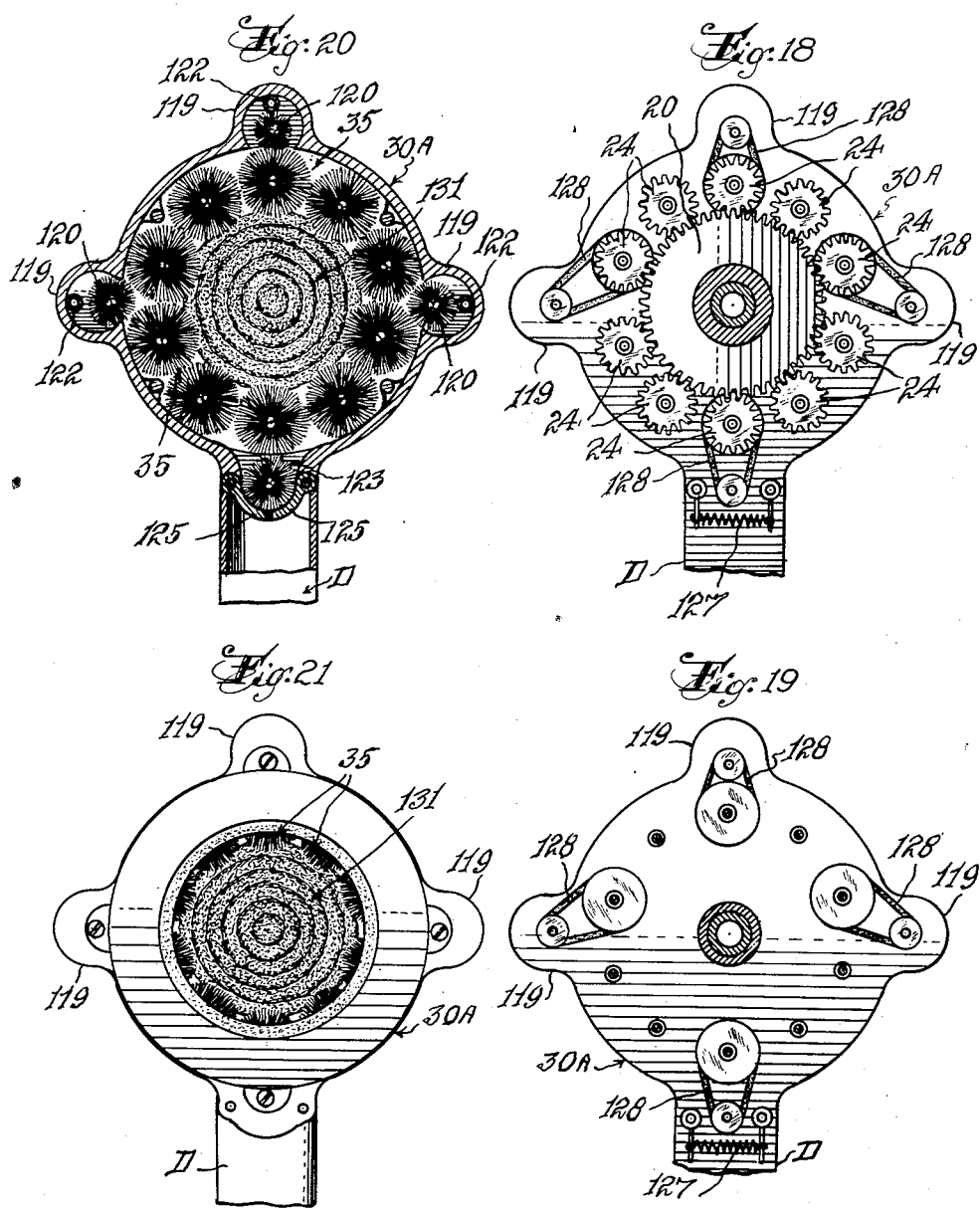

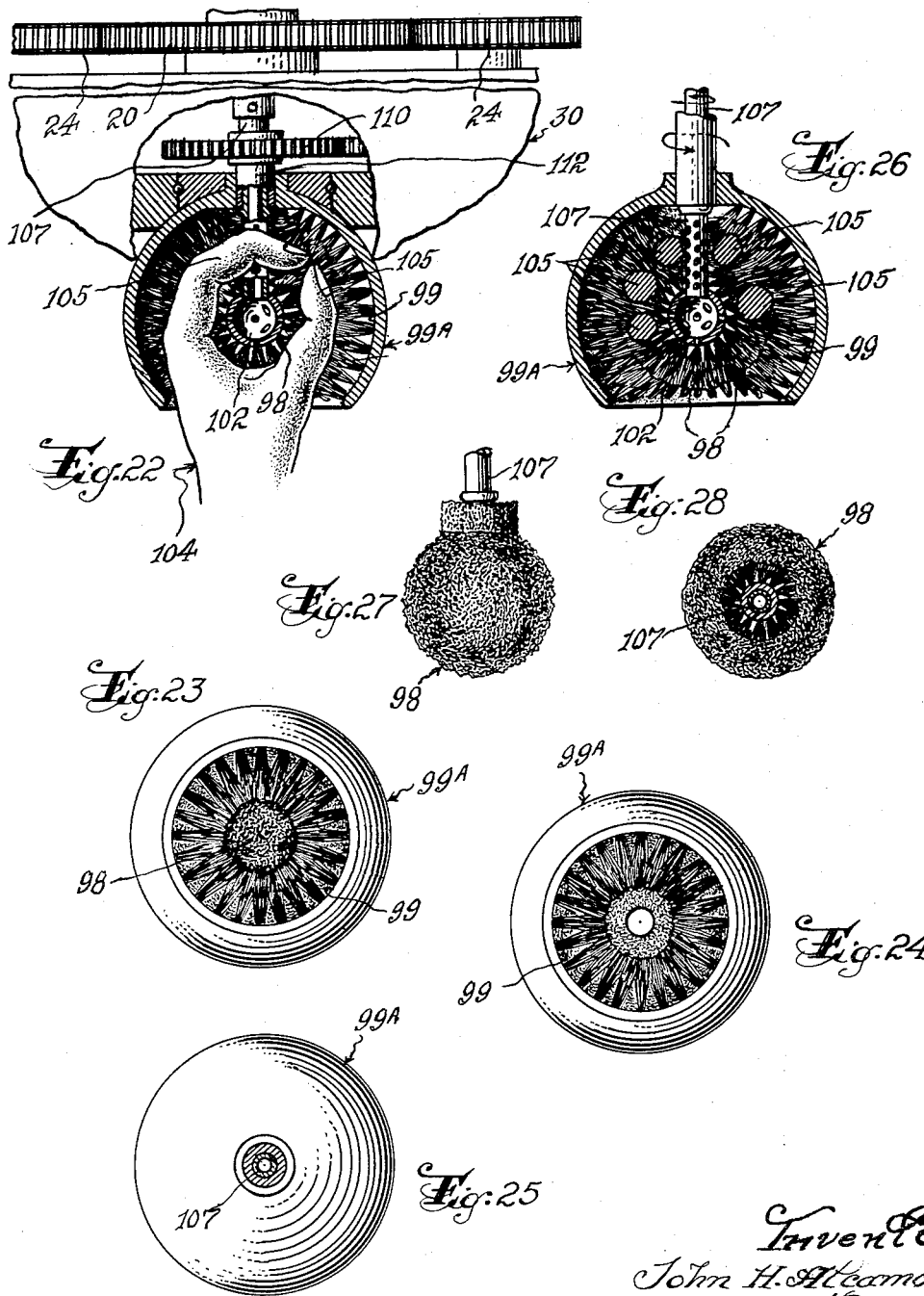

United States Patent Office 2,952,859
Patented Sept. 20, 1960

2,952,859
SURGEONS' PRE-OPERATING SCRUBBING MACHINE

John H. Alcamo, 321 S. 9th St., Newark, N.J.

Filed Mar. 19, 1958, Ser. No. 722,450

7 Claims. (Cl. 15—21)

This invention relates to a pre-operating scrubbing machine for surgeons, anesthetists, nurses, etc.

Ten minutes is the usual time necessary for manual scrubbing of the hands and arms preparatory to an operation. This time-consuming procedure must usually be done by each of five operating room persons, a surgeon, an assistant surgeon, an anesthetist, and two nurses, each using a different washing facility. Thus, fifty minutes of valuable time is taken up in the manual scrubbing, wherein one hand scrubs the other. The number of surgical operations required in hospitals demands that time be saved in every possible way, to make maximum use of operating rooms and their personnel. Furthermore, emergency operations frequently do not allow time for adequate sterilization by manual scrubbing.

The present invention provides practically complete sterilization of a surgeon's hands in one minute, and, to attain the degree of sterilization provided by the present machine, would require one hundred and twenty manual scrubbings of ten minutes each. And the structure of this machine is such that it may itself be sterilized, and kept so.

The invention comprises the following features. A pair of scrubbers is provided, one to receive each arm. Each scrubber comprises a cylindrically arranged series of individually rotatable scrubbing elements, as, for example, elongate brushes with bristles, or equivalent, as of foam rubber or plastic. Provision is also made for simultaneously rotating the scrubbing elements. The scrubbing elements are preferably made so that the arm space tapers to conform to the general shape of the arm; special means is provided for adjusting the scrubbing elements for this purpose. Each scrubber also preferably includes a finger brush, and a special hand-enclosing brush, later described, may be used. The construction of each scrubber is such that all the brushes may be taken out as a unit, to provide for sterilization of the brushes and the interior of their enclosing casing after use. The machine also includes means for selectively supplying different liquids to the scrubbing elements, as for example, a liquid detergent, a liquid germicide, and water. The supply of such liquids is desirably under the control of the surgeon, or other user, in which case the legs may be used for such control, the arms being in the scrubbers and therefore not available for this purpose.

Fig. 5 is side view of the upper part of Fig. 1;

Fig. 6 is a rear view of the upper part of Fig. 1;

Fig. 7 is a horizontal section through one of the scrubbers, taken just above the diametral plane and showing the lower half, omitting some brushes, for clarity;

Fig. 8 shows a view similar to Fig. 7, showing pipes but no brushes, the latter omitted for clarity;

Fig. 9 is an exploded side view of the coupling means between a stub shaft that carries gears and brushes;

Fig. 10 is an end view of the parts shown in Fig. 9;

Fig. 11 is a fragmentary cross-sectional enlarged view showing means of mounting the adjustable forward ends of some of the brushes;

Fig. 12 is a section taken on line 12—12 of Fig. 7;

Fig. 13 is a vertical section of a scrubber taken just behind the disk-like spacer plate at the forward end of the bristles of the scrubber, and showing an adjustable brush spider in one of its adjustments;

Fig. 14 is a vertical section similar to Figs. 12 and 13, but is taken approximately at the vertical center of a scrubber;

Fig. 15 is a view similar to Fig. 12, but approximately on line 15—15 of Fig. 7, looking in the direction of the arrows;

Fig. 16 is similar to Fig. 13, but showing the adjusting spider in a different adjustment than that of Fig. 13;

Fig. 17 is a view similar to Fig. 12, but taken in front of the holding-in plate;

Fig. 18 is a rear view of the planetary gearing of Fig. 7 and the scrubber construction thereof, with special feeding brushes;

Fig. 19 is a view similar to Fig. 18 but taken on a plane behind the sun and planetary gears;

Fig. 20 is a vertical section through the scrubber, showing the operation of the brushes and also special feeding brushes, in the modification shown in Fig. 18;

Fig. 21 is a front elevation of the device shown in Fig. 18;

Fig. 22 is a fragmentary sectional view through a portion of the finger cleaning area of a modified form of scrubber, which I may employ;

Fig. 23 is a front elevation of the device of Fig. 22, with the mounting omitted for the sake of clearness;

Fig. 24 is a view similar to Fig. 23, but with the finger cleaning brush unit removed;

Fig. 25 is a rear view of Fig. 23;

Fig. 26 is a view similar to Fig. 22, but taken at right angles to Fig. 22;

Fig. 27 is an elevational view of the central brush shown in Fig. 22;

Fig. 28 is a rear view of Fig. 27.

Figure 1:
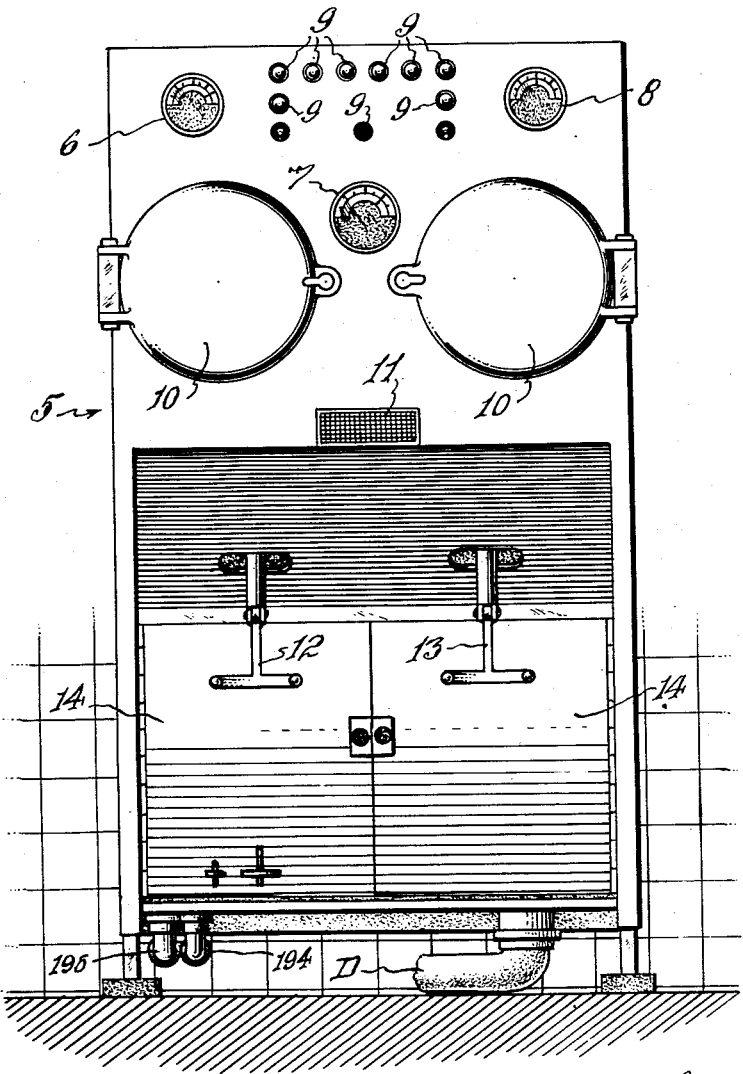
Fig. 1 is front elevation of the machine, with arm hole doors closed.

In the drawings, the numeral 5 indicates the somewhat elevated cabinet, which encloses the working parts. The front view (Figs. 1 and 2) shows electric meters 6, 7 and 8, lights 9 to indicate different phases of operation of the machine, hinged arm holed doors 10, drying hot-air outlet 11, laterally-movable, leg-operated levers 12 and 13 for admitting and controlling various liquids into the machine, and doors 14 set back of said levers (Fig. 4) as the lower part of the front of the cabinet. The back 15 of the cabinet is slidable vertically for access to the working parts. The air inlet for an air blower is shown at 16 in Fig. 5.

Figure 3:
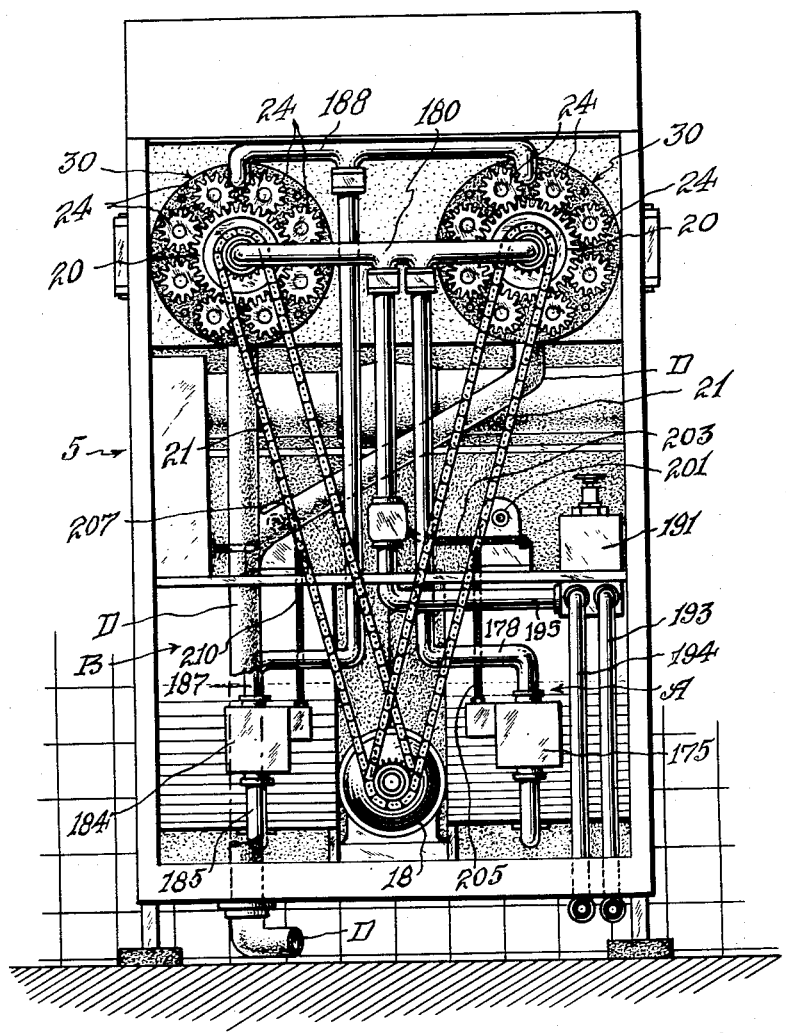
Fig. 3 is rear elevation of the machine, with back plate removed.
Figure 4:
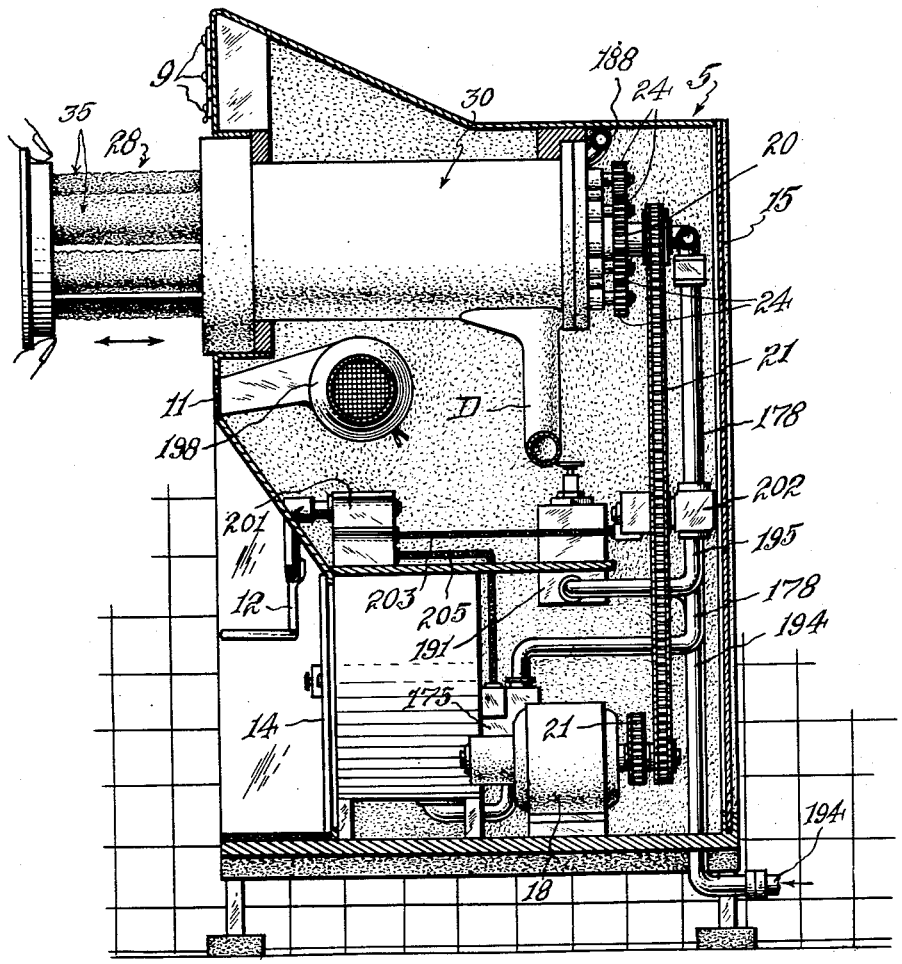
Fig. 4 is a central vertical section of Fig. 1, looking left but with the brushes being removed therefrom.

An electric motor 18 (Fig. 4) provides the motive power. Figs. 3 and 4 show that the motor rotates a pair of horizontally spaced sun gears 20 by means of obliquely disposed silent driving chains 21, which engage sprocket wheels 22 mounted on rotatable sleeves 23. Eight planetary gears 24 mesh with each of the sun gears, so that rotataion of the latter rotates the planet gears individually. The sleeves 23 are held in end plates 27 of scrubbers 28 (Figs. 7 and 9), as are shafts 29 on which the planetary gears are mounted.

There are two similar scrubbers 28, one for each arm of the surgeon. The scrubbers are mounted horizontally, in spaced relation, within the mentioned cabinet. Each scrubber comprises a cylindrical casing 30, with a rear end plate 27, and an angular, removable, front sealing-in plate 31, an internal spacer disk 33 near the rear end of the cylinder, and eight spaced, elongate bristle brushes 35 circularly arranged within the casing, each brush mounted at its distal end to be rotated by one of the planet gears, the proximal ends of the brushes mounted in the front sealing-in plate 31. The feature of a plurality of individually rotating brushes provides rapid scrubbing action. Each brush comprises a central wire core 38 to which the bristles are radially attached, and each wire core is connected to a stub shaft 40 by a flexible connector or coupling 41, which may be of rubber. The shafts 40 are rotatably mounted in the spacer disk 33 and are detachably connected to the planetary gear shafts 29 by pin-and-slot connections 45, shown in detail in Figs. 9 and 10, so that the unit comprising the brushes, front plate 31 and spacer disk 33 may be pulled out from the cylinder through the arm hole of the cabinet if and when desired. The pin and slot connection comprises a pin 40A disposed transversely through stub shaft 40 and fitting into one of the diametral grooves 40B formed in the inner end of shaft 29.

As seen in Fig. 7, the wire cores 38 of the brushes are inclined relative to the axis of the cylinder, made possible by the flexible connections 41, and the brush bristles are progressively longer from the front to the rear of the scrubber, thereby defining an arm space conforming to arm proportions, it being understood that the best surgical practice requires that the arm be scrubbed up to the biceps.

Fig. 7 also shows that some of the brushes have longer bristles at the wrist region, as at 42′, which brushes alternate with brushes having longer bristles at the elbow region, as indicated at 42, the better to scrub the irregular surfaces at these areas. A circular brush 45′ is secured to the inner face of the spacer disk 33, to scrub the fingers, and Fig. 7 indicates that the bristles of this brush, and of the forward portions of brushes 35, which scrub the hands, are relatively stiffer than the bristles that scrub the forearms and upper arms, where the skin is more sensitive.

For the purpose of adjusting the area of the arm space within the cylinder of brushes, to fit arms of different diameters, the forward or proximal ends of the four upper brushes are rotatably secured to a semi-circular wire 48 (Fig. 13), by eyelets 50 attached thereto and encircling the wire cores of the said upper brushes, in front of the forward ends of the bristles. The ends of wire 48 are secured to bulbous links 52 (Figs. 11 and 13), to which are also secured a lower semi-circular wire 55, the latter not attached to the lower brushes. Downward pressure of the surgeon's arms on lower wire 55, however, pulls down the four upper brushes, as allowed by the flexible couplings 41, thus diminishing the area of the arm space and bringing the brushes 35 into contact with the arms, as shown in Fig. 16. Upward pressure of the arm on the upper wire 48 will enlarge the arm area to allow easy withdrawal of the arm. To hold the upper brushes in desired position, a spring 57 (Figs. 11, 13 and 16) projects outwardly from each bulbous link 52 and is pressed by front sealing-in plate 31 into a groove formed in a fixed lug 59, the latter projecting inwardly from the cylinder 30. As shown, each lug 59 has a series of horizontal parallel grooves into which the spring 57 may be sprung. The forward ends of the four upper brushes are movable in radial slots 63 (Fig. 17) where they pass through the sealing-in plate 31, and the forward ends of all the brush cores are peened over onto the outer surface of plate 31 to hold them thereto. A rubber disk 65, centrally apertured at 66, constitutes a front closure to the scrubber when a surgeon's arm is therein, the aperture being smaller than the arm, so that the disk fits snugly around the arm and thus keeps all liquid within the scrubbers. This rubber disk also wipes off most of the liquid from the arms as the latter are withdrawn. An apertured ring 68 holds the rubber disk in place. The plate 31 at the front of the scrubber is held in place by screws 70, shown in Fig. 17. The adjusted pressure exerted by these screws on the front closing-in disk 31, is used to obtain the desired pressure of springs 57 on the grooved lugs 59, since plate 31 presses against the bulbous links 52 (Fig. 11) to which springs 57 are attached.

Figs. 8, 12, 14 and 15 show apertured spray pipes 60, secured at their forward ends to cylinders 30, and running substantially parallel to, and between, certain brushes 35 of the upper half of the scrubber, so that these brushes may be sprayed with such liquids as water, soap or detergent solution, or germicides. The system for supplying such liquids will be later described.

Figs. 22 through 28 show a special form of scrubber for the hand, which may be used instead of the brush 45 of Fig. 7. The present form comprises an inner spherical brush 98 rotating within a spherical outer, hollow brush 99, which is open at the front. The inner brush is for scrubbing the inner part of the hand and also between the fingers, and the outer brush the outer part of the hand. The inner brush, with outwardly radiating bristles, and the outer brush, with inwardly radiating bristles, are adapted to rotate on horizontal shafts in opposite directions and at different speeds. The bristles of the inner brush are mounted in a hollow sphere 102, which has distributed apertures therethrough, so that the bristles may be sprayed with a cleansing liquid which also brushes onto the bristles of the outer brush, the bristles of both contacting, as shown in Figs. 23, 24 and 26. Fig. 22 shows a hand 104 grasping the inner brush, the numeral 105 of Fig. 26 indicating the fingers, between which some bristles extend. The hollow sphere 102 is attached to a tube 107 which has distributed apertures at its inner end for spraying the inner and outer brushes. Tube 107, and therefore the inner brush, is rotated by sun gear 20. The outer brush is connected to, and rotated by, spur gear 110 (Fig. 22), and in a direction opposite to the rotation of the inner brush and at a different speed. Gear 110 is mounted on tubular shaft 112, which is secured to and rotates shell 99A of the outer brush.

Figs. 18 through 21 show the planetary gearing and brushes of Fig. 7, but also show special rotatable feeding brushes disposed in radial extensions 119 of the enclosing cylinder 30A. The latter brushes, four in number, are designated 120, and are disposed 90° apart and parallel with the brushes 35, as shown in Fig. 20. They are, however, offset outwardly from the cylinder formed by brushes 35 and rotate in pools of liquid, such as soap solution or germicidal liquid, for example, and feed the liquid onto brushes 35, said liquid being supplied through pipes 122 for the three upper feed brushes. The liquid of the sump 123 in which the lowest brush rotates, is that which drains from all of the brushes 35. The lower part of the sump is closed by hinged gates 125 which are held closed by a tensioned light spring 127 at the rear end of the cylinder, as illustrated in Fig. 18, until filled with liquid, at which time the weight of liquid overcomes the tension of the spring and the doors open to release the liquid, whereupon the doors close again, the release of the liquid periodically being desirable as the sump liquid contains bacteria, etc. The feeder brushes 120 are rotated each by one of the planet gears, as shown in Figs. 18 and 19, belts 128 connecting the planets and the feed brushes. The numeral 131 (Figs. 20 and 21) indicates a modified form of brush for the ends of the fingers, which brush may be used in lieu of brush 45 of Fig. 7. The brush 131 is formed of concentric layers of bristles for penetration of the fingers between the layers, and especially to assure cleaning of the nails.

Provision is made for supplying various liquids to the scrubbers, and, to that end, tank A (Figs. 3 and 4) contains a detergent solution, such as liquid soap, for example, which is pumped from this tank, by a pump 175, into the apertured pipes 60 of Fig. 8 to be sprayed onto the brushes. The liquid enters the pump through pipe 177 and leaves it through pipe 178 to enter a distributing pipe 180 (Figs. 3 and 4) leading to the two scrubbers; then it enters a manifold 183 (Figs. 7, 9 and 15) to which the apertured spray pipes 60 are connected.

Tank B (Fig. 3) contains germicidal or sterilizing liquid which is pumped by pump 184 from the tank, by way of pipe 185, into pipe 187, from which the liquid enters distributing pipe 188 (Fig. 7), and then enters manifold 183. Hot and cold water enter a mixing valve 191 through pipes 193 and 194 respectively, from which valve the warm water enters a single pipe 195 which leads to distributing pipe 180 and then goes to the mentioned spraying pipes of the scrubbers. Known equipment, including timers, may be used, if desired, to automatically supply the different liquids in the proper sequence, each for a predetermined time.

Figure 2:
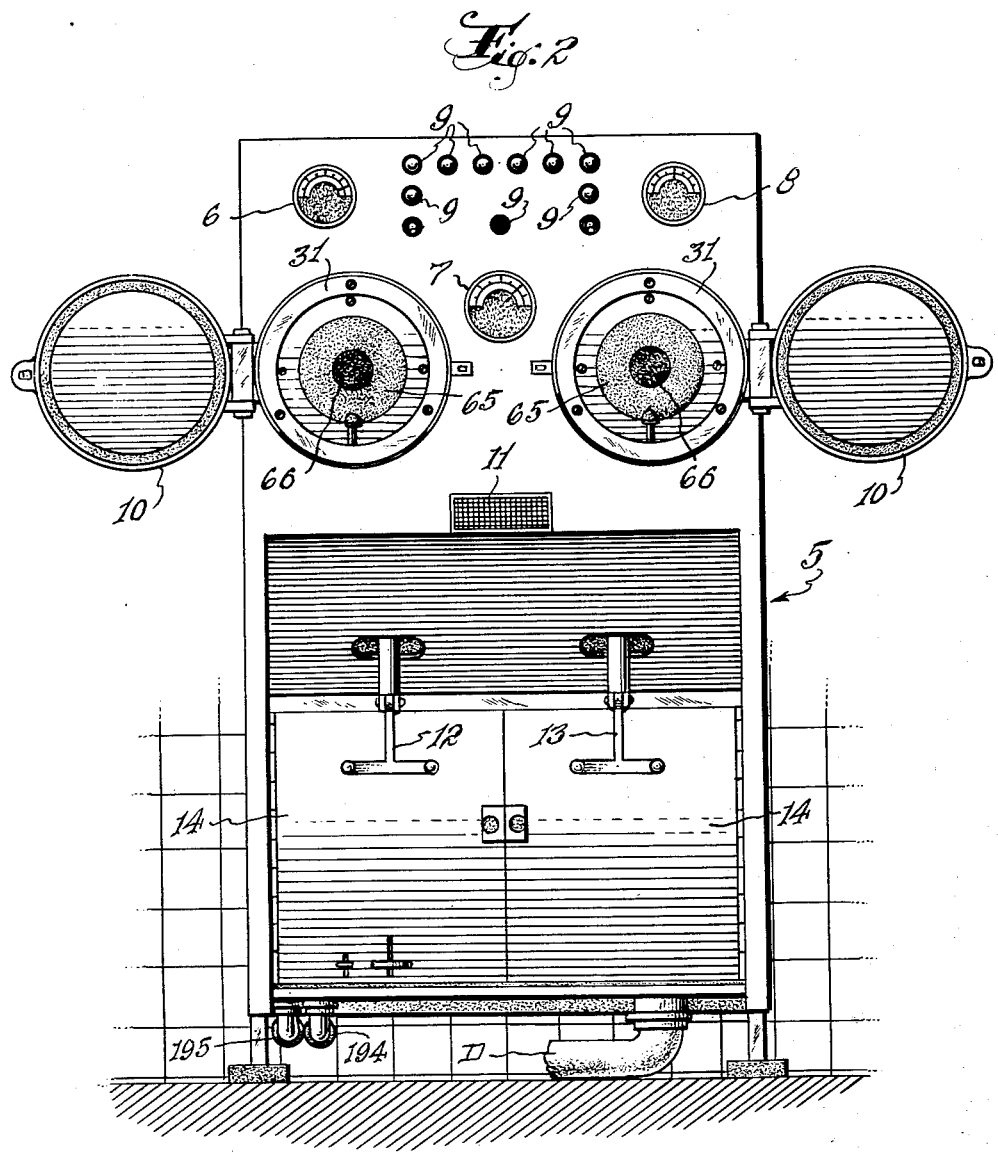
Fig. 2 is similar to Fig. 1, but with arm hole doors open.

The supply of liquids from tanks A and B, and the flow of water, may be turned on and off, and regulated, by the action of the surgeon's legs on the mentioned levers 12 and 13 (Figs. 1, 2 and 4). These levers are bifurcated at their free ends to receive the legs, and are movable thereby to the right and to the left. Moving the left lever 12 to the left controls the water supply, while its movement to the right controls the detergent supply. The right lever 13 controls the germicide supply when moved to the left and when moved to the right controls the dryer 198 (Fig. 4). The dryer is a combination heater and blower, to blow drying hot air onto the hands of the surgeon as soon as he withdraws them from the scrubbers. As shown in Fig. 4, the left leg-operated lever 12, when moved to the right, closes a self-opening switch within switch housing 201, to operate the pump 175, through cable 205, to pump the detergent solution from tank A, and this movement of the lever also magnetically opens a valve in the pipe, and within said housing, to allow flow of the detergent through pipe 178. When lever 12 is moved to the left, it closes a self-opening switch within casing 202 (Fig. 4) through cable 203, to magnetically open a valve in the pipe, enclosed in the casing 202, to allow water to flow through pipe 195. When the right leg-operated lever 13 is moved left, it closes a self-opening switch in the housing 207 to operate pump 184, which pumps the germicidal solution from tank B, and this movement of the lever also magnetically opens a valve in pipe 187, and within the pump casing 184, through conductor 210, to allow flow of the germicidal solution. Movement of lever 13 to the right actuates the heating coil and the blower of dryer 198 whereby to dry the surgeon's hands as soon as he takes them out of the scrubbers. Fig. 3 shows drain pipes D for taking liquid from the bottoms of the scrubbers.

While I have described the liquid in conducting systems as operated by the mentioned leg levers, they may also be operated automatically by known means, including timers, if desired. The leg-controlled levers, however, permit control by personal choice as to the length of time desired for any phase of the operation, which is usually preferred by surgeons.

What is claimed is:

1. In a machine of the character described, a composite hand brush comprising a generally spherical, outer brush, open at the front, for scrubbing the outer surface of the hand, and an inner substantially spherical brush for scrubbing the hand's inner surface, the outer brush having inwardly radiating bristles and the inner brush having outwardly radiating bristles, means to rotatably mount said brushes, means for applying a liquid to the bristles of said inner and outer brushes and separate means for rotating the inner and outer brushes.

2. In a pre-operating scrubbing machine for surgeons, etc., a pair of elongate scrubbers, each adapted to receive an arm and each comprising a casing and a plurality of spaced, elongate scrubbing elements within said casing and circularly arranged endwise to provide a tapered arm space therein, means to rotatably and adjustably mount said scrubbing elements for individual rotation and adjustment, in combination with means operable by the arm within each scrubber for changing the relative position of the scrubbing elements therein for the purpose of varying the arm space to fit arms of different sizes cross-sectionally.

3. In a pre-operating scrubbing machine for surgeons, etc., a pair of elongate scrubbers, each adapted to receive an arm and each comprising a casieng and a plurality of spaced, elongate scrubbing elements within said casing and circularly arranged endwise to provide a tapered arm space therein, means to rotatably and adjustably mount said scrubbing elements for individual rotation and adjustment, said scrubbing elements being individually mounted at their distal ends to allow angular movements thereof.

4. In a pre-operating scrubbing machine for surgeons, etc., a pair of elongate scrubbers, each adapted to receive an arm and each comprising a casing and a plurality of spaced, elongate scrubbing elements within said casing and circularly arranged endwise to provide a tapered arm space therein, means to rotatably mount said scrubbing elements for individual rotation, said scrubbing elements being brushes and said casings comprising troughs adapted to receive and hold liquid and circumferentially offset from the body of the casings, means for supplying liquid to said troughs, feeder brushes in said troughs and disposed adjacent the circularly arranged brushes to feed liquid to the latter brushes and means to rotatably mount said feeder brushes.

5. In a pre-operating scrubbing machine for surgeons, etc., a pair of elongate scrubbers, each adapted to receive an arm and each comprising a casing and a plurality of spaced, elongate scrubbing elements within said casing and circularly arranged endwise to provide a tapered arm space therein, means to rotatably mount said scrubbing elements for individual rotation, said casings comprising troughs adapted to receive and hold liquid, one of said troughs depending from the lowest part of the casing to receive drainage liquid from the scrubbing elements and comprising self-closing means adapted to be opened by the pressure of a pre-determined amount of liquid in the depending troughs.

6. In a machine of the character described, a composite hand brush comprising a rotatable, generally spherical, outer brush, open at the front, for scrubbing the outer surface of the hand, and an inner, substantially spherical brush for scrubbing the hand's inner surface, the outer brush having inwardly radiating bristles and the inner brush having outwardly radiating bristles, means to rotatably mount said brushes, means for applying a liquid to the bristles of said inner and outer brushes and separate means for rotating the inner and outer brushes, in opposite directions.

7. In a pre-operating scrubbing machine for surgeons, etc., a pair of elongate scrubbers, each adapted to receive an arm and each comprising a casing and a plurality of spaced, elongate scrubbing elements within said casing and circularly arranged endwise to provide a tapered arm space therein, means to rotatably and adjustably mount said scrubbing elements for individual rotation and adjustment, means adjacent the proximal and distal ends of the elements uniting the elements of each scrubber into a unit, and a drive shaft for each scrubbing element, each drive shaft comprising a pin and groove coupling.

References Cited in the file of this patent

UNITED STATES PATENTS

| | | |
|---|---|---|
| 259,939 | Stetson et al. | June 20, 1882 |
| 668,189 | Kayser | Feb. 19, 1901 |

(Other references on following page)

UNITED STATES PATENTS

| | | |
|---|---|---|
| 1,192,314 | Howlett | July 25, 1916 |
| 1,366,306 | Wick | Jan. 18, 1921 |
| 2,097,952 | Lohr | Nov. 2, 1937 |
| 2,230,404 | Healey | Feb. 4, 1941 |
| 2,248,205 | Stobbe | July 8, 1941 |
| 2,272,481 | Rinkes et al. | Feb. 10, 1942 |
| 2,345,294 | Schauffler et al. | Mar. 28, 1944 |
| 2,516,223 | Lowe | July 25, 1950 |
| 2,648,862 | Barnes | Aug. 18, 1953 |
| 2,730,104 | Newman | Jan. 10, 1956 |